(12) United States Patent
Sieben et al.

(10) Patent No.: US 10,124,896 B2
(45) Date of Patent: Nov. 13, 2018

(54) GALLEY MODULE, CABIN ARRANGEMENT, AND AIRCRAFT

(71) Applicant: Airbus Operations GmbH, Hamburg (DE)

(72) Inventors: Martin Sieben, Hamburg (DE); Javier Perez-Torra, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 111 days.

(21) Appl. No.: 14/879,362

(22) Filed: Oct. 9, 2015

(65) Prior Publication Data

US 2016/0101866 A1 Apr. 14, 2016

(30) Foreign Application Priority Data

Oct. 10, 2014 (EP) .................................... 14188548

(51) Int. Cl.
*B64D 11/04* (2006.01)
*B64C 1/14* (2006.01)

(52) U.S. Cl.
CPC ............ *B64D 11/04* (2013.01); *B64C 1/1423* (2013.01)

(58) Field of Classification Search
CPC ...................................................... B64D 11/04
See application file for complete search history.

(56) References Cited

U.S. PATENT DOCUMENTS

| | | | | |
|---|---|---|---|---|
| 4,776,903 | A * | 10/1988 | Nordskog | B64D 11/04 156/153 |
| 7,780,114 | B2 * | 8/2010 | Doebertin | B64D 11/04 244/118.5 |
| 8,387,916 | B2 * | 3/2013 | Baatz | B64D 11/0007 244/118.1 |
| 9,321,533 | B2 * | 4/2016 | Cuddy | B64C 1/1407 |
| 9,359,078 | B2 * | 6/2016 | Burd | B64D 11/04 |
| 2001/0050519 | A1 * | 12/2001 | Kasuya | B64D 11/04 312/315 |
| 2007/0228216 | A1 | 10/2007 | Wenstrom | |
| 2010/0181425 | A1 * | 7/2010 | Guering | B64D 11/00 244/118.5 |

(Continued)

FOREIGN PATENT DOCUMENTS

| | | |
|---|---|---|
| CN | 1681706 A | 10/2005 |
| CN | 101765541 A | 6/2010 |

(Continued)

OTHER PUBLICATIONS

European Patent Office, European Search Report for European Patent Application No. 14188548.3 dated Apr. 2, 2015.

(Continued)

*Primary Examiner* — Justin M Benedik
(74) *Attorney, Agent, or Firm* — Lorenz & Kopf LLP

(57) ABSTRACT

A galley module comprises a base galley section and a top galley section, wherein the base galley section comprises a top end adapted for carrying the top galley section. The base galley section comprises a first functional arrangement with a first access direction in a horizontal plane and the top galley section comprises at least one second functional arrangement having a second access direction in the horizontal plane. The first access direction and the second access direction enclose an angle of at least 90° in the horizontal plane.

13 Claims, 4 Drawing Sheets

(56) References Cited

U.S. PATENT DOCUMENTS

2012/0032026 A1* 2/2012 Becker .............. B64D 11/0023
244/118.5
2014/0125092 A1* 5/2014 Schreuder .............. B64D 11/00
297/163
2014/0218239 A1 8/2014 Sharawi et al.

FOREIGN PATENT DOCUMENTS

| CN | 102224073 A | 10/2011 | | |
|---|---|---|---|---|
| CN | 103118942 A | 5/2013 | | |
| EP | 1520783 A1 | 4/2005 | | |
| WO | 2012110643 A1 | 8/2012 | | |
| WO | WO 2012110643 A1 * | 8/2012 | ............. | B64D 11/02 |

OTHER PUBLICATIONS

Peoples Republic of China, Chinese Office Action for Chinese Patent Application No. 201510652042.8 dated Mar. 27, 2017.

\* cited by examiner

GALLEY MODULE, CABIN ARRANGEMENT, AND AIRCRAFT

CROSS-REFERENCE TO RELATED APPLICATION

This application claims priority to European Patent Application No. 14 188 548.3, filed 10 Oct. 2014, which is incorporated herein by reference in its entirety.

TECHNICAL FIELD

The embodiments described herein relate to a galley module, a cabin arrangement for a cabin of a vehicle as well as an aircraft having a cabin with such a cabin arrangement.

BACKGROUND

Commonly, a cabin of an aircraft or another large commercial vehicle comprises a plurality of passenger seats as well as a number of functional components, such as cabin monuments comprising a toilet, a galley, cabin attendant seats and so on. Due to a limited installation space in the cabin, galley modules are often installed in the vicinity of an aircraft door, at a forward-most end or at a rearward-most end of the cabin.

A galley module often comprises a front, which is accessible to cabin personnel. The front may be divided in several different sections for accomplishing different tasks. For example, a galley may comprise a plurality of storage spaces at a bottom side for storing cabin trolleys. These are adapted for receiving a trolley, which is pushed into the respective storage space along the cabin floor. Furthermore, a galley may comprise additional, but smaller storage compartments above the storage spaces, which storage compartments are adapted for storing various items or food. Still further, it is known to provide compartments for receiving electrically operated devices, such as ovens, coffee machines, etc. which are usually referred to as galley inserts (GAIN).

U.S. Pat. No. 7,780,114 B2 shows a modular galley for an aircraft with several vertical and horizontal structural elements and usage areas provided there between for accommodating slide-in devices.

Furthermore, it is known to combine different functional components into a larger monument extending over the complete width of a rear section of an aircraft cabin. Exemplarily, WO 2012110643 A1 discloses a combination of lavatory modules and galley modules in one large monument.

SUMMARY

The size of galleys to be integrated, especially in a door region of an aircraft cabin, is limited due to several regulations, which e.g. require the ability for a direct view from certain positions in the cabin. For example, regulatory authorities require that each seat located in a passenger compartment designated for use by cabin crew members should provide an unobstructed view of the cabin area for which the respective crew member is responsible. In this regard, the term "direct view" stands for providing a visual contact with a cabin main area and aisles, enabling a flight attendant to be made aware of safety related passenger needs when a respective flight attendant is seated.

Furthermore, it is a constant aim to increase the number of passenger seats in an aircraft cabin, such that a space-efficient design of a galley module is desired, which may be installed in spaces that do not suggest themselves for passenger seats or that allow to reduce the available space inside the cabin. Hence, it is an object of the embodiment to provide a galley module, which is as space-efficient as possible.

A galley module is provided that comprises a base galley section and a top galley section, wherein the base galley section comprises a top end adapted for carrying the top galley section, wherein the top galley section is positioned on the top end of the base galley section. The base galley section comprises at least one first functional arrangement with a first access direction in a horizontal plane. A main part of the top galley section comprises at least one second functional arrangement having a second access direction in the horizontal plane. The first access direction and the second access direction enclose an angle of at least 90° in the horizontal plane.

Hence, the galley module is basically divided into two separate or segregated vertical sections, which are arranged on top of each other. The base galley section may be designed so as to be placed on a cabin floor and so as to be lockable in position. The base galley section may rigidly support the top galley section. Since it is arranged under the top galley section, it may comprise at least one horizontally accessible opening that has a lower end flush with a cabin floor, on which the base galley section is located. Consequently, the base galley section may preferably comprise at least one storage compartment for receiving cabin trolleys or other large or bulky items, allowing to simply push objects into the base galley section or to simply pull them out.

Basically, the top galley section may include any device or arrangement for any desire and may either form an integral part with the base galley section or may be realized as a separately manufactured component, which is simply attached to a dedicated receiving surface or frame of the base galley section. In this regard, a main part may refer to at least ⅔ of a main measure, such as the width, or the volume of the top galley section. This does not exclude the fact that a minor part of the top galley section may include a clearly smaller arrangement, which comprises another access direction.

A gist of the embodiment lies in providing two different access directions, which are at least perpendicular to each other. This design particularly allows the installation of the galley module according to the embodiment in a region with a strictly limited space, such as in a door region of the aircraft cabin. As the base and the top galley section are separated through their "twist" and as the access directions differ, it may especially be possible to provide clearly different widths and depths of both sections, such that the top section does not obstruct a direct view from a cabin attendant seat at a certain position and by still allowing to provide a sufficient space in a base galley section, e.g. for storing cabin trolleys.

Such a "twisted" design particularly aims at optimizing the use of available cabin floor space forward and aft of the door areas, while the galley module according to the embodiment may also be integrated into other spots in the cabin with strict space constraints. Furthermore it allows to separate passenger related and cabin crew related functions of the galley module through their different access directions. Advantageously, this enables self-service stations, e.g. for domestic flights with reduced service or minimum cabin crew or long range flights during cabin crew off-duty time. In addition, passenger-related functions of the galley module may improve certain lounge or first class configurations.

Resultantly, the galley module has two distinct main advantages. A first essential advantage lies in the physical separation of the space required in front of the top galley section and the base galley section. This leads to gaining additional space for lateral seating areas in a cabin by especially turning the base galley section part towards a cross aisle, e.g. between two longitudinal (in x-direction of the aircraft) aisles and therefore reducing the space required by the items for use in the top galley section or in the lower galley section in a longitudinal (x) direction.

Further, additional storage space or work deck space in or in front of the top galley section may be created, as the internal layout of the galley module may be completely rearranged to make best use of the available space, such as aircraft structure and systems. This leads to avoiding operational problems of lateral transversal galleys with door frame lining, door hinges, slide rafts or other items by turning either the top or base section of the galley module towards a longitudinal aisle in the cabin.

Still further, a clear separation, which may be accomplished by means of a curtain, may be accomplished between the top and base galley section. This enables access to the trolleys or other bulky items stored in the base galley section from a dedicated galley area reserved for cabin crew members, while still allowing passenger to access snacks, drinks or electrically operated devices adapted for self-service operation in the top galley section without entering said dedicated galley area.

In addition, the "twisted" design improves the structural integrity of the galley module.

In an advantageous embodiment, the angle enclosed by the first axis direction and the second axis direction is 90°. Hence, the base galley section and the top galley section have front faces, which are perpendicular to each other on a horizontal plane, such that the functions accomplished by both galley sections are clearly separated from each other. Especially in regions in front of or at the end of a passenger seat arrangement or group, or in corners where two adjacent faces of the galley module are accessible, such a perpendicular arrangement is preferred.

In an alternative, the angle enclosed by the first axis direction and the second axis direction may also be 180°. This may be feasible in regions in front of or behind arrangements of passenger seats particularly in cabins with two parallel aisles, when the galley module is placed in a center region between the two aisles.

In a still further advantageous embodiment, the first functional arrangement comprises at least one storage space for receiving containers for use inside the cabin. These containers may be cabin trolleys or other containers for storing food or other items. Preferably, the base galley section is coupled with or includes a cooling system for cooling the containers to be stored in the storage spaces. However, as the base galley section preferably comprises larger dimensions than the top galley section, the storage spaces may also be adapted for receiving other large and bulky items or containers.

It is preferred that the second functional arrangement comprises at least one storage compartment. The storage compartment may be adapted for housing electrically operated or non-electrical devices for use in the cabin. However, the storage compartment may also simply be adapted for storing various items, which may be used inside the cabin.

Still further, the base galley section comprises a width, which exceeds the depth of the top galley section. Especially in a perpendicular arrangement of both access directions, only a part of a top end of the base galley section is occupied by the top galley section.

Still further, the base galley section comprises a working surface, which extends from a first lateral wall of the base galley section to an access side of the top galley section. When the top galley section is smaller in depth than the width of the base galley section, this leaves a part of the top end of the base galley section unused, which part may preferably be adapted for constituting a working surface. This part may be equipped with a surface coating, e.g. a resin and fiber web based laminate or any other suitable surface cover designed for this purpose.

The galley module may further comprise a holder for attaching a partition curtain. The top galley section and/or the base galley section may then have limited or no access, depending on the exact position of the holder, when the partition curtain is attached to the holder and extends to another position in the cabin. In an advantageous embodiment, the holder may be a removable holder, which is fastenable at different positions of the galley module. For this purpose, the holder may comprise a latching mechanism that allows to selectively attach the holder to the galley module at different positions throughout the normal operation of the vehicle, i.e. without requiring tools.

As indicated above, the second functional arrangement may be adapted for housing electrically operated galley inserts, such as coffeemakers, ovens, etc. or non-electrical inserts.

Embodiments further relate to a cabin arrangement for a cabin in a vehicle, comprising a cabin floor and a galley module having any of the features mentioned above, which galley module is arranged on the cabin floor.

The cabin arrangement may further comprise a door region, wherein an access side of the base galley section faces the door region. A door region is to be understood as a part of the cabin, which is directly adjacent to an access door that selectively opens or closes an opening in a fuselage of the vehicle and provides access from outside the vehicle into the cabin inside the vehicle. The door region preferably includes a cabin floor section, which directly follows on the opening in the fuselage and which must be trespassed when entering or leaving the cabin.

In another advantageous embodiment, the galley module rests flush against an inner wall of the cabin, wherein an access side of the top galley section faces away from said inner wall.

Still further, the cabin arrangement may comprise a partition curtain extending between the galley module and a monument inside the cabin.

Also, the galley module may be arranged between an aisle and a door region, wherein the partition curtain extends between an edge of the galley module facing the aisle and the monument.

Still further, the embodiments relate to an aircraft having a cabin arrangement according to the above-mentioned features.

BRIEF DESCRIPTION OF THE DRAWINGS

The various embodiments will hereinafter be described in conjunction with the following drawing figures, wherein like numerals denote like elements, and.

In addition, other objects, desirable features and characteristics will become apparent from the subsequent summary and detailed description, and the appended claims, taken in conjunction with the accompanying drawings and this background.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
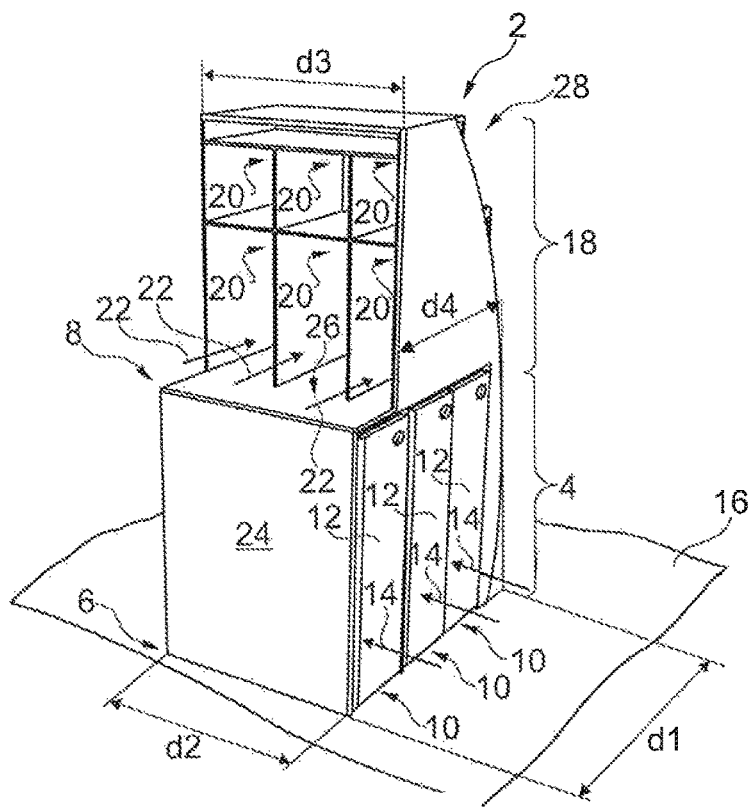
FIG. 1 shows a schematic three-dimensional view of an empty galley module according to an embodiment.

FIG. 1 shows an empty galley module 2 having a base galley section 4 comprising a lower end 6 and a top end 8, between which exemplarily three storage spaces 10 for receiving cabin trolleys are located. Just for the purpose of providing an exemplary embodiment, the base galley section 4 comprises a number of flaps 12 for covering access openings of the storage spaces 10. This may particularly support a cooling function and prevent cooled air to flow out from the individual storages spaces 10. It goes without saying that the base galley section 4 may comprise a larger or smaller number of storage spaces 10 or any other functional arrangement, which allows to efficiently use the space provided in the base galley section depending on the available and/or required installation space.

The cabin trolleys may be moved in their associated storage spaces 10 through pushing in a first access direction 14 or through pulling opposite to the first access direction 14 parallel to a cabin floor 16, on which the lower end 6 rests. As the galley module 2 is adapted for the installation in an aircraft cabin or the cabin of another commercial transportation means, the cabin floor 16 is horizontal, such that the first access direction 14 lies in a horizontal plane.

On top of the top end 8, a top galley section 18 is positioned, which comprises a number of storage compartments 20 for receiving electrically operated galley devices, so-called galley inserts (GAIN), for receiving non-electrical inserts (NELI) or for simply being used for storing items, which may be supported by a door or a flap for selectively opening and closing the storage compartments 20. The top galley section 18 is not necessarily a separately manufactured part, which is then installed on top of the base galley section 4, but it may also be an integral part together with the base galley section 4.

A characteristic feature of the galley module 2 according to an embodiment lies in the fact that the top galley section 18 comprises a second access direction 22, which is parallel to the cabin floor 16 and which encloses an angle to the first access direction 14 of exemplarily 90°. Hence, the access directions for the top galley section 18 and the base galley section 4 are perpendicular to each other. This means, that a person standing in front of a lateral wall 24 of the base galley section 4 may simply access the storage compartments 20 or any other functional arrangement of the top galley section 18, while the storage compartments 10 for cabin trolleys or any other functional arrangement remains completely unobstructed. This provides to the ability to access the storage spaces 10 independently, while allowing a space efficient design of the galley module 2.

The width of the base galley section 4 is indicated by d1. This measure may be determined by the available (and required or desired) space in the cabin and is measured along the individual storage spaces 10 between the outermost lateral delimitations. The depth of the base galley section 4 is indicated by d2. In case it is planned to store full size cabin trolleys in the base galley section 4, the measure d2 may be determined by the extension of these full size trolleys. However, it may also be possible to store a single half size trolley, a plurality of half size trolleys one behind the other or a combination of one or more half size trolleys and a full size trolley. Thus, the dimension d2 is not limited by the length of a common full size or half size trolley.

To achieve a harmonic appearance and for rendering the use of the available space as efficient as possible, the width of the top galley section 18, which is indicated by d3, may be equal to d2. However, this is not necessarily the case, as by reducing the width d3 or by exceeding the width d2, the creation of a step between both galley sections 4 and 18 is possible.

The depth of the top galley section 18, which is indicated by d4, may be clearly smaller than d1, such that a fraction of a surface 26 on the top end 8 of the base galley section 4 remains unused, but provides a working surface 26 or allows to temporarily deposit objects. It goes without saying, that the working surface 26 may preferably be coated or covered with an abrasion resistant material.

The galley module 2 exemplarily comprises a second lateral surface 28, which is positioned opposite to the first lateral surface 24, but is not necessarily closed. As apparent in FIG. 1, the second lateral surface 28 is curved, which allows to install the galley module 2 in a lateral region of a cabin, such that the second lateral surface 28 rests flush on an interior surface of a cabin lining, which follows the contour of the fuselage.

Figure 2:
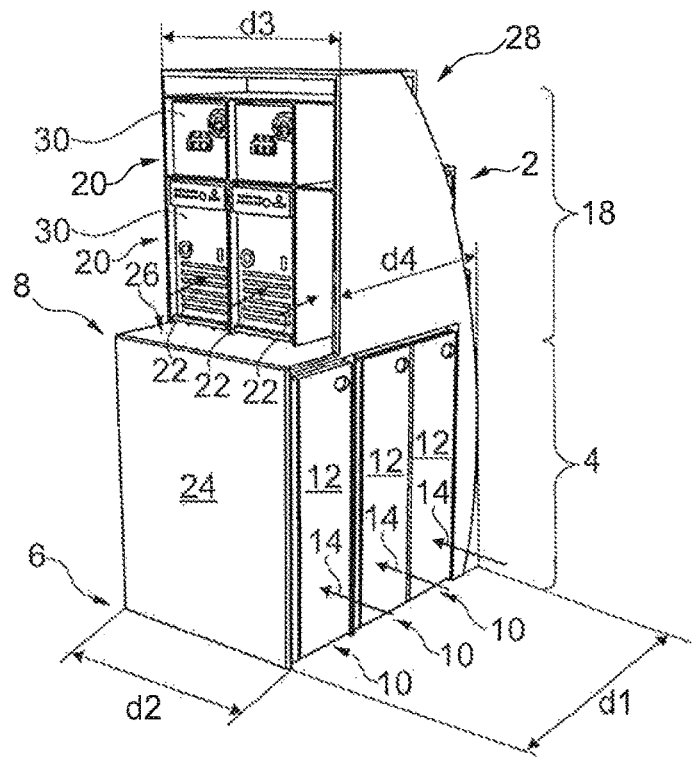
FIG. 2 shows a schematic three-dimensional view of a galley module equipped with galley inserts according to an embodiment.

In FIG. 2, the galley module 2 is shown with galley inserts 30 placed in a part of the top galley section 18, i.e. in suitably adapted storage compartments 20. These may include ovens, coffeemakers or other electrically operated or non-electrical inserts. It is conceivable that the storage compartments 20 house devices, which may be accessible by passengers, for example for flights with a reduced service on board. These devices may simply include just shelves or trays that store snacks or drinks, while also devices for making coffee are possible. It is clearly apparent from FIG. 2 that the storage spaces 10 remain completely unobstructed even when a plurality of persons access the top galley section 18.

Figure 3A:
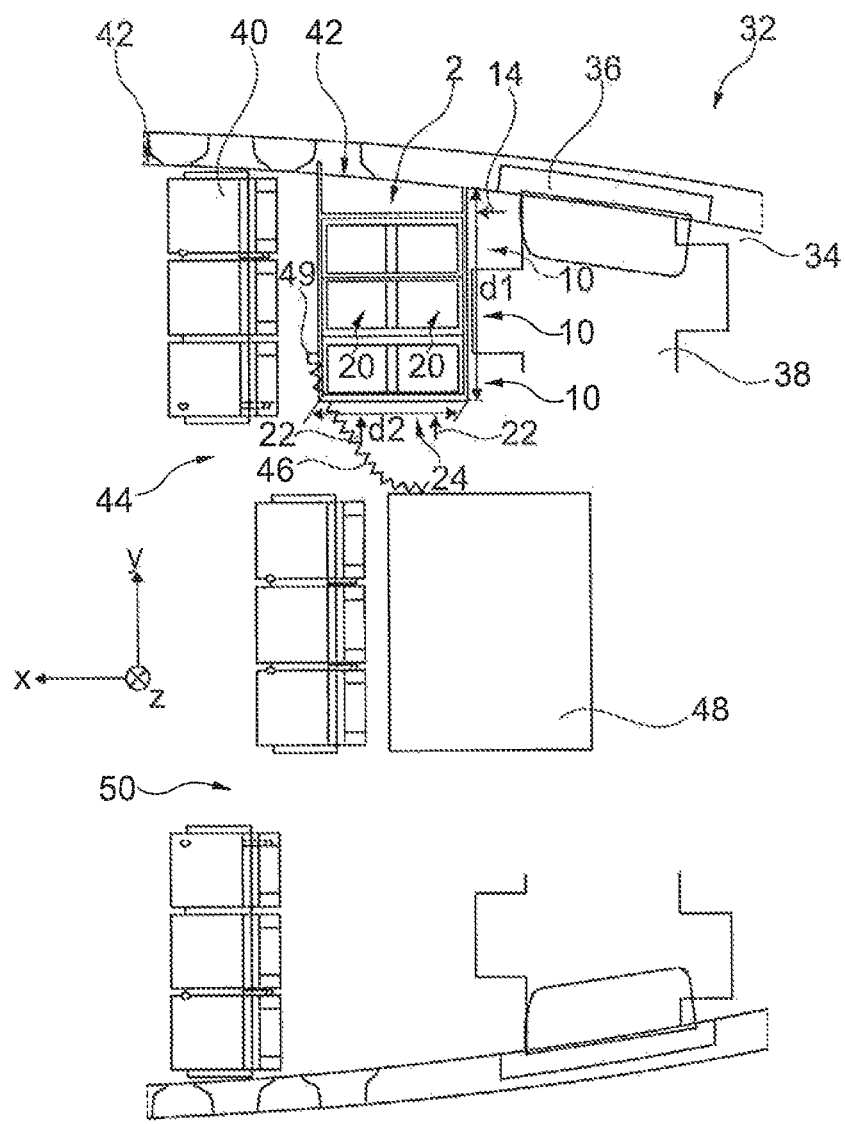
FIGS. 3A and 3B show a top view onto a cabin of an aircraft having a galley module comprising a partition curtain according to embodiments.
Figure 3B:
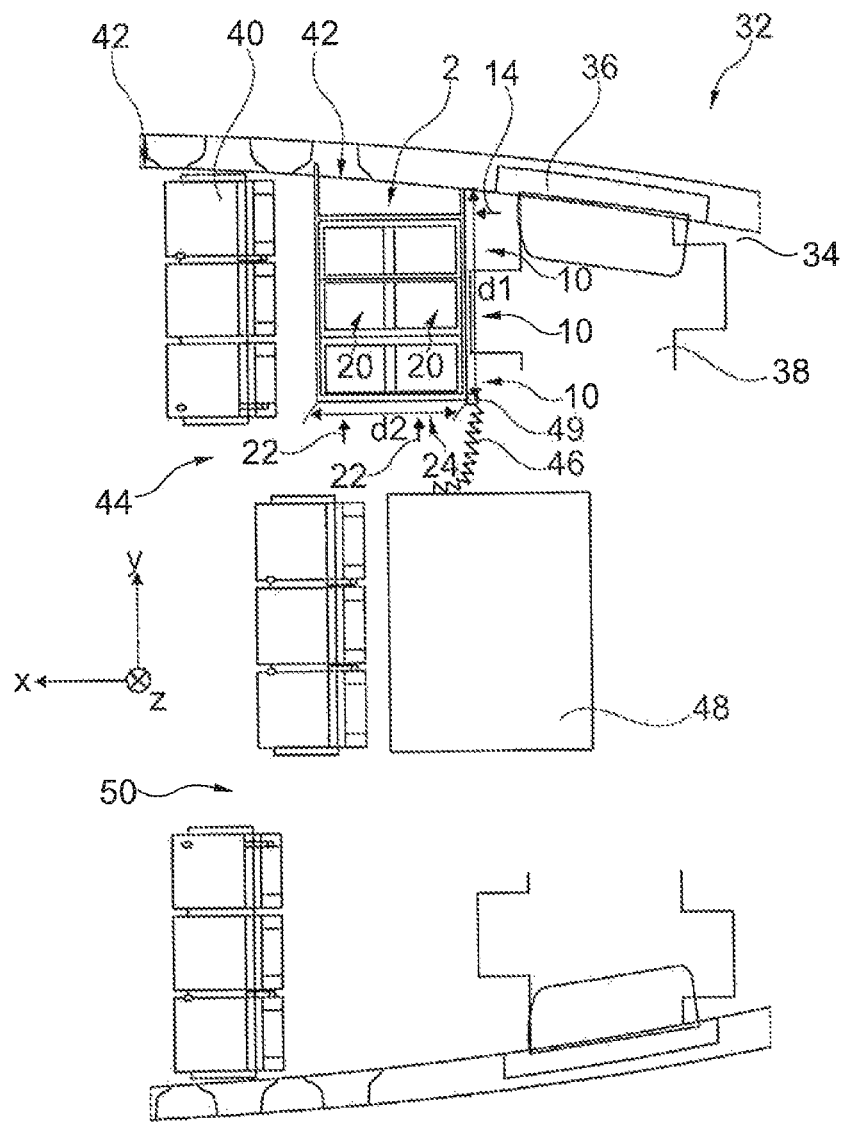

In FIGS. 3A and 3B, a cabin arrangement 32 is shown. Exemplarily, FIG. 3A shows a rear section of a cabin 34 with a door 36, a door region 38 directly adjacent to the door 36 inside the cabin 34, a group of exemplarily three seats 40, which group extends from a fuselage wall 42 to an aisle 44 as well as the galley module 2 of FIGS. 1 and 2. The galley module 2 extends from a lining element 42 into the direction of the aisle 44, but does not extend into the cabin 34 as far as the group of seats 40 does. This means, that the first lateral surface 24 comprises a distance to the innermost seat 40 in y-direction. However, in case the group of seats 40 only comprises two seats or less, the galley module 2 may extend further into the cabin 34 than the group of seats 40 does. The galley module 2 may also be designed so as to extend as far into the cabin 34 as the group of seats 40 does.

The storage spaces 10 are accessible from the door area 38 in the first access direction 14, while the storage compartments 20 are accessible from the aisle 44 in the second access direction 22.

It may be possible to let a partition curtain 46 extend between the galley module 2 and a center monument 48, such that the access to the galley module 2 may be limited. For example, the curtain may be extendable from a forward end of the galley module 2 (in x-direction) to the center monument 48, such that neither the storage compartments 20 nor the storage spaces 10 are accessible. The partition curtain 46 may be fixed to the galley module 2 by means of a holder 49, which may be rigidly mounted to the galley module 2, or which may be releasably fastenable in order to change its position. The opposite end of the partition curtain 46 may be attachable to a corresponding holder or lock (not illustrated).

FIG. 3B shows an alternative arrangement, in which the partition curtain 46 extends from a rear end of the galley module 2 to the center monument 48, such that at least the storage compartments 20 are accessible from a person on the aisle 44. This may also allow passengers to use the top galley section 18, which may be adapted for self-service operation.

Also, two partition curtains 46, i.e. the one shown in FIG. 3A and the one shown in FIG. 3B, may both be present and both may extend from an end of the galley module 2 to another installation in the cabin 34, such as the center monument 48.

In the exemplary embodiments shown in FIGS. 3A and 3B, the cabin 34 comprises a second aisle 50, which extends at an opposite side of the center monument 48 parallel to the other aisle 44. However, this is not necessarily the case, as the galley module 2 may also be installed in a cabin having only a single aisle.

Figure 4:
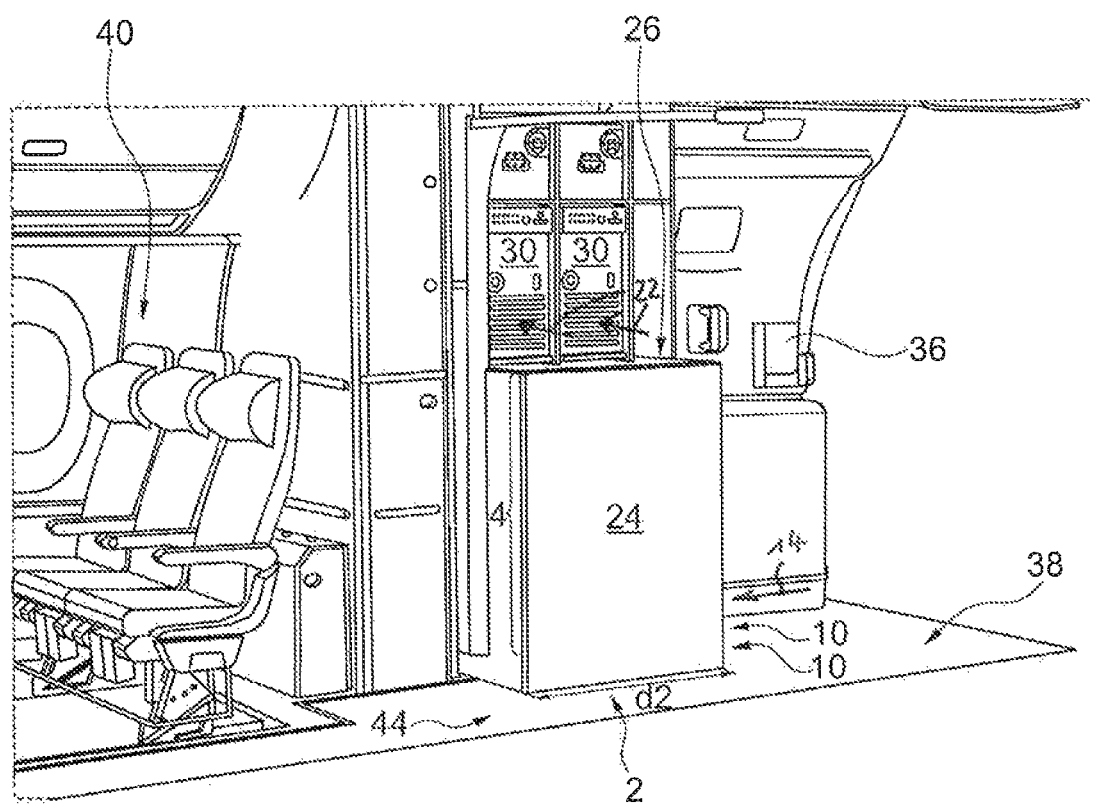
FIG. 4 shows a three-dimensional view of a galley module installed in a cabin of an aircraft according to an embodiment.

In a still further view presented in FIG. 4, a three-dimensional illustration of the cabin arrangement 32 without partition curtain 46 is shown from an aisle position, showing the group of seats 40, the galley module 2 as well as the door 36 and the door region 38. It is apparent that the base galley section 4 slightly extends into the aisle 44 and allows a person to have access to galley inserts 30. In front of the galley inserts 30, a workspace 26 is available for temporarily placing objects.

In these illustrations, the storage spaces 10 are hidden, but it is clearly apparent that they may be accessed from the door region 38. Hence, even if the storage compartments 20 are accessed from a position adjacent to the first lateral wall 24, the storage spaces 10 remain completely unblocked.

Due to the reduced size of the top galley section 18, a direct view from a cabin attendant seat at an opposite side of the door region 38 is not obstructed. Hence, the galley module 2 according to this embodiment allows to efficiently use the space available in or directly adjacent to the door region 38 under compliance with all relevant regulations.

In FIGS. 1 to 4, a galley module 2 is shown with a first access direction 14 and a second access direction 22, which are perpendicular to each other. However, depending on the available installation space, the access directions may also enclose a clearly larger angle, such as 180°. This means, that the storage compartments 20 may be accessible from a rear side of the galley module, while the storage spaces 10 are accessible from a front side of the galley module 2.

It is also conceivable that the galley module 2 is arranged in a forward-most area of the cabin, such as in a forward door region or between a door region and a cockpit.

It should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A galley module, comprising:
a base galley section having a depth,
a top galley section having a width that corresponds to the depth of the base galley section,
a first lateral surface,
a curved second lateral surface opposite the first lateral surface, and adapted to a lateral region of a cabin, and
a working surface,
wherein the base galley section comprises a top end adapted for carrying the top galley section,
wherein the base galley section exclusively comprises a first functional arrangement with a first access direction in a horizontal plane,
wherein a main part of the top galley section comprises a second functional arrangement comprising a plurality of storage compartments occupying the entire width of the top galley section, each of the plurality of storage compartments having a second access direction in the horizontal plane,
wherein the main part of the top galley section refers to at least two-thirds of the volume of the top galley section,
wherein the first access direction and the second access direction enclose an angle of at least 90° in the horizontal plane,
wherein the base galley section is directly accessible from the first lateral wall,
wherein the base galley section comprises a working surface, which extends from the first lateral wall of the base galley section to an access side of the top galley section in the direction of the second lateral surface, and
wherein the top galley section is smaller in depth than the width of the base galley section, such that a part of the top end of the base galley section opposite to the second lateral surface constitutes the working surface.

2. The galley module of claim 1, wherein the angle enclosed by the first access direction and the second access direction is 90°.

3. The galley module of claim 1, wherein the angle enclosed by the first access direction and the second access direction is 180°.

4. The galley module of claim 1, wherein the first functional arrangement comprises at least one storage space for receiving containers for use inside the cabin.

5. The galley module of claim 1, wherein the base galley section comprises a width, which exceeds the depth of the top galley section.

6. The galley module of claim 1, further comprising a holder for attaching a partition curtain.

7. The galley module of claim 1, wherein the second functional arrangement is adapted for housing galley inserts.

8. A cabin arrangement for a cabin of a vehicle, comprising:
a cabin floor; and
a galley module arranged on the cabin floor, the galley module, comprising:
a base galley section having a depth,
a top galley section having a width that corresponds to the depth of the base galley section,
a first lateral surface,
a curved second lateral surface opposite the first lateral surface adapted to a lateral region of a cabin, and
a working surface,
wherein the base galley section exclusively comprises a top end adapted for carrying the top galley section,
wherein the base galley section comprises a first functional arrangement with a first access direction in a horizontal plane,
wherein a main part of the top galley section comprises a second functional arrangement comprising a plurality of storage compartments occupying the entire width of the top galley section, each of the plurality of storage compartments having a second access direction in the horizontal plane,
wherein the main part of the top galley section refers to at least two-thirds of the volume of the top galley section,
wherein the first access direction and the second access direction enclose an angle of at least 90° in the horizontal plane,
wherein the base galley section is directly accessible from the first lateral wall,
wherein the base galley section comprises a working surface, which extends from the first lateral wall of the base galley section to an access side of the top galley section in the direction of the second lateral surface, and
wherein the top galley section is smaller in depth than the width of the base galley section, such that a part of the top end of the base galley section opposite to the second lateral surface constitutes the working surface.

9. The cabin arrangement of claim 8, further comprising a door region, wherein an access side of the base galley section faces to the door region.

10. The cabin arrangement of claim 8, wherein the galley module rests flush against an inner wall of the cabin, wherein an access side of the top galley section faces away from said inner wall.

11. The cabin arrangement of claim 8, further comprising a partition curtain extending between the galley module and a monument inside the cabin.

12. The cabin arrangement of claim 11, wherein the galley module is arranged between an aisle and a door region, wherein the partition curtain extends between an edge of the galley module facing the aisle and the monument.

13. An aircraft cabin arrangement, comprising:
a cabin floor;
a galley module arranged on the cabin floor, the galley module, comprising:
a base galley section having a depth,
a top galley section having a width that corresponds to the depth of the base galley section,
a first lateral surface,
a curved second lateral surface opposite the first lateral surface adapted to a lateral region of a cabin, and
a working surface,
wherein the base galley section exclusively comprises a top end adapted for carrying the top galley section,
wherein the base galley section comprises a first functional arrangement with a first access direction in a horizontal plane,
wherein a main part of the top galley section comprises a second functional arrangement comprising a plurality of storage compartments occupying the entire width of the top galley section, each of the plurality of storage compartments having a second access direction in the horizontal plane,
wherein the main part of the top galley section refers to at least two-thirds of the volume of the top galley section,
wherein the first access direction and the second access direction enclose an angle of at least 90° in the horizontal plane,
a partition curtain extending between the galley module and a monument inside the cabin,
wherein the galley module is arranged between an aisle and a door region, wherein the partition curtain extends between an edge of the galley module facing the aisle and the monument,
wherein the base galley section is directly accessible from the first lateral wall,
wherein the base galley section comprises a working surface, which extends from the first lateral wall of the base galley section to an access side of the top galley section in the direction of the second lateral surface, and
wherein the top galley section is smaller in depth than the width of the base galley section, such that a part of the top end of the base galley section opposite to the second lateral surface constitutes the working surface.

* * * * *